I. C. JENNINGS.
INTERNAL COMBUSTION GENERATOR.
APPLICATION FILED OCT. 29, 1907.
1,024,079.
Patented Apr. 23, 1912.
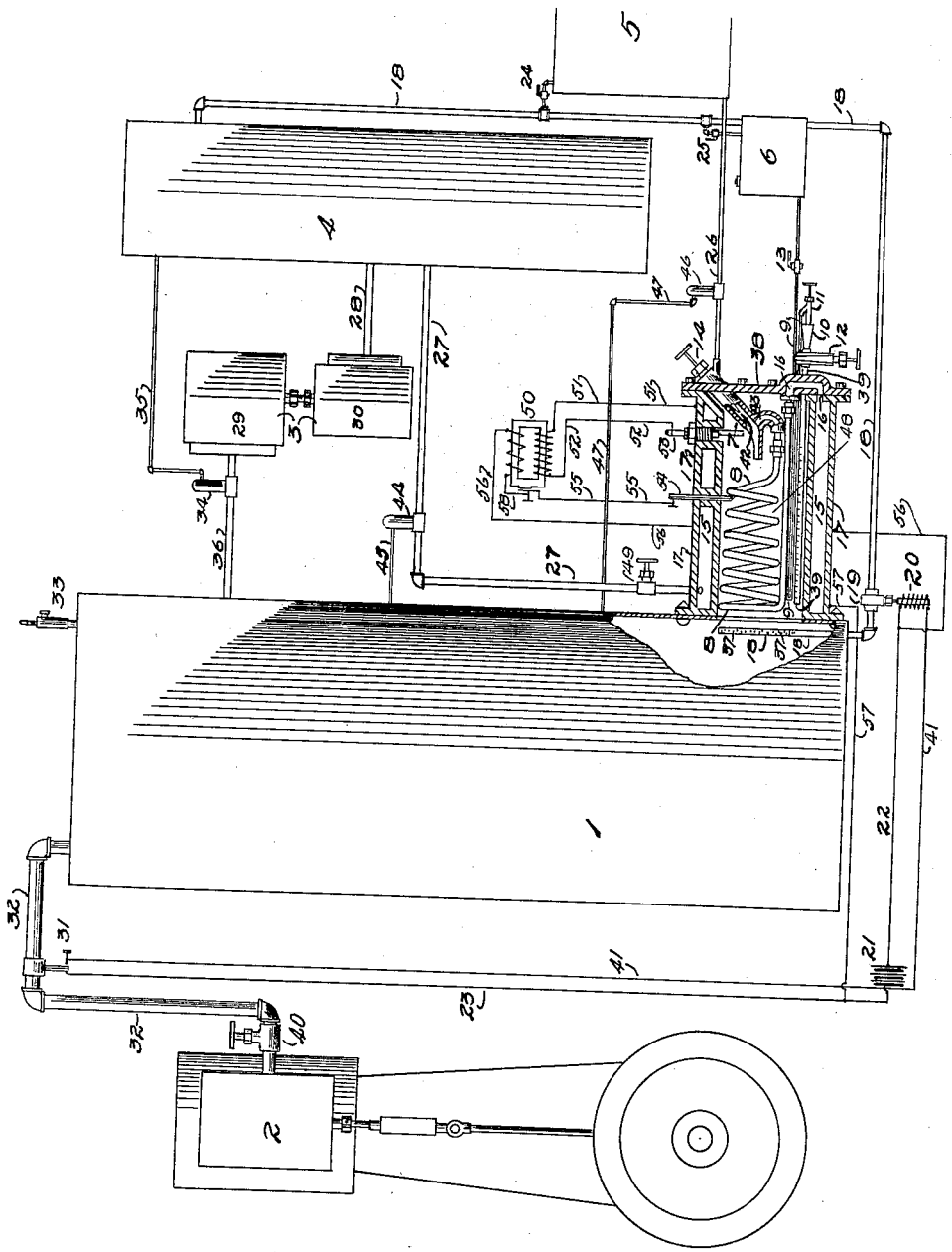
WITNESSES:
INVENTOR

UNITED STATES PATENT OFFICE.

IRVING C. JENNINGS, OF SOUTH NORWALK, CONNECTICUT.

INTERNAL-COMBUSTION GENERATOR.

1,024,079.  Specification of Letters Patent.  Patented Apr. 23, 1912.

Application filed October 29, 1907. Serial No. 399,736.

*To all whom it may concern:*

Be it known that I, IRVING C. JENNINGS, a citizen of the United States, residing at South Norwalk, in the county of Fairfield and State of Connecticut, have invented a new and useful Internal-Combustion Generator, of which the following is a specification.

My invention relates to the burning of oil or gas under pressure in a suitable closed receptacle and utilizing the energy in the products of combustion of same in any form of engine adapted to produce power from the potential energy of a gas under pressure. In other words, my invention makes it possible to obtain power from the fuel direct. And the objects of my invention are; 1st—The production of power more economically than has heretofore been possible; 2nd—The improvement in the control of internal combustion engines, making said control equal to that of the steam engine; 3rd—To supply the means for any engines now using steam, to produce power from any fuel direct, with the gain in economy and saving of space incident thereto.

Those familiar with the subject are aware that attempts up to the present time to burn fuel continuously in a closed receptacle under pressure greater than the atmosphere, have been unsuccessful. In former burners, the fuel and air necessary for combustion have been mixed before being introduced and the two brought in together. It has been impossible to keep this mixture constant in quantity and quality due to unavoidable fluctuations in pressure in the space where combustion takes place. Hence, the flame blows out or burns back, or the fuel is only partially consumed.

My invention makes it possible to have continuous and perfect combustion in a closed space under varying pressures, and to expand the products of combustion in a heat engine to produce power. I accomplish this: 1st—by introducing the fuel and air separately, thus doing away with back firing; 2nd—by introducing the air at a temperature hot enough to gasify or vaporize the entering fuel or even to ignite it; 3rd—by causing said air to impinge upon the fuel at a high velocity, atomizing the said fuel and materially aiding in its vaporization and intimate mixture with air; 4th—by introducing air in excess of that required for combustion, by maintaining the supply of said air at a pressure greater than that desired in the combustion chamber and automatically shutting off fuel when predetermined pressure in said combustion chamber has been reached.

My invention further consists in cooling the mechanism internally by the introduction of air controlled by a thermostat, thus gaining in economy by saving the heat that would have been lost if a cooling medium had been applied on the outside or saving the heat that would have been lost in vaporization had water been introduced as cooling medium internally. The heat abstracted by this cooling air is not lost but goes toward raising the potential energy of the incoming air, which with that in the products of combustion is used to produce power in a suitable engine.

My invention, the principle of which has been outlined above, is illustrated somewhat diagrammatically in the accompanying drawing, the combustion chamber being shown in section to make clear its internal operation.

Similar numbers refer to similar parts and, 1— is a storage tank; 2— is an engine of conventional type formerly using steam to produce power; 3— is an air compressor; 4— is a storage tank for air; 5— is the main fuel tank; 6— is a tank containing volatile oil, such as gasolene to be used for starting purposes; 7— is an inlet tube for air and fuel; 8— is a coil of pipe through which the air to support combustion is heated and introduced at the base of the tube, 7; 9— is a vaporizing coil for an auxiliary burner of Bunsen type; 10 and 11— are the mixing chamber and the fuel valve of auxiliary Bunsen burner; 12— is a valve mounted on mixing chamber 10 to be closed when Bunsen burner is shut off after heating coil 8 sufficiently to raise incoming air to desired temperature; 13— is a valve controlling the fuel supply to auxiliary Bunsen burner; 14— is a needle valve controlling main fuel supply; 15— is an annular space surrounding the combustion chamber, 48, in which air is warmed before entering coil 8. This air at the same time acts as a cooling medium. 16— is a passage in the head of the combustion chamber connecting annular space 15 and coil 8; 17— is the outside casing or jacket of the combustion chamber; 18— is a pipe through which cooling air from air storage tank 4 is introduced into tank 1;

19— is a valve on pipe 18; 20— is a solenoid operating valve 19; 21— is a battery; 22— 23— is part of a circuit connecting battery 21 with solenoid 20; 24—25— are air connections from tank 4 to respective fuel tanks; 26— is main fuel pipe from tank 5 to needle valve 14; 27— is air pipe from tank 4 to annular space 15 surrounding combustion chamber 48; 28— is delivery pipe from air compressor to storage tank 4; 29— is power cylinder of air compressor; 30— is air cylinder of air compressor; 31— is thermostat controlling solenoid 20 through wires 23, 22, 41 and battery 21; 32— is pipe from tank 1 to engine 2; 33— is safety valve on tank 1; 34— is pressure regulator subject to pressure in tank 4 controlling air compressor; 35— is operating pipe of pressure regulator 34; 36— is supply pipe connecting tank 1 with air compressor 3; 37— represents perforations in air pipe 8 to split up cooling air entering tank 1; 38— is head of combustion chamber; 39— is auxiliary Bunsen burner mixer tube; 40— is valve on pipe 32; 41— is a wire forming part of circuit controlling solenoid 20 through battery 21 and thermostat 31; 4— is fuel inlet nozzle of main burner; 43— is inlet passage for hot air used to support combustion in main burner; 44— is automatic regulator, subject to pressure in tank 1 controlling the admission of air used to support combustion in main burner, i. e. within combustion chamber 48; 45— is pipe controlling automatic regulator 44; 46— is automatic regulator subject to pressure in tank 1 controlling supply of fuel to main burner; 47— is pipe controlling regulator 46; 48— represents combustion chamber; 49— is valve on air pipe 27; 50— is induction coil; 51— is wire forming ground on one end of secondary coil of induction coil 50; 52— is wire connecting other end of secondary coil of induction coil 50 to spark plug 53; 53— is spark plug of ordinary type; 54— is thermostat closing electric circuit to coil 50 when temperature of coil 8 is sufficiently reduced; 55, 56, 57 and 58— are wires completing circuit to coil 50 from battery 21 through thermostat 54.

The principle of operation of the invention the parts of which are designated above is as follows: A pressure is first obtained in tank 4 by convenient outside means. Then with safety valve 33 open causing atmospheric pressure to exist in tank 1 and in combustion chamber 48, the Bunsen burner 10, 11, 39 is started in the manner usually employed with such burners by heating vaporizing coil 9 by convenient means as by inserting a torch in a hole not shown which can afterward be stopped by a valve or by other means. When Bunsen burner has heated coil 8 to a sufficient temperature, main air valve 49 and main fuel valve 14 are slowly opened. Fuel and air are forced into combustion chamber 48 by the air pressure behind them and are ignited by the flame from the Bunsen burner. If desired the fuel may be introduced by gravity. Any method of heating the coil 8 will answer; a burner of Bunsen type is convenient however. As soon as the main burner is well under way, valves 11, 12, 13 and valve through which torch was inserted to heat vaporizing coil 9 of auxiliary Bunsen burner are closed, together with safety valve 33. The flame from main burner playing upon coil 8 now keeps same hot continuously. The products of combustion pass from the combustion chamber into the tank 1 and raise the pressure therein until the automatic regulators 46 and 44 shut off the fuel and the air supporting combustion. Before this point is reached, however, the engine 2 is started by the products of combustion under pressure in tank 1 and may be used to do useful work. The pressure in tank 1 will now remain somewhere near constant, the amount of said pressure being determined by the adjustment of the regulators of fuel and air, 46 and 44. Said regulators opening more and more as the pressure in tank 1 falls due to increase load on engine 2 and gradually closing as pressure in tank 1 rises due to lessening the load on engine 2. The regulator 46 is always set to close sooner than regulator 44 so that there may always be an excess of air to support combustion. As soon as air pressure in tank 4 begins to fall, regulator 34 opens valve on pipe 36 connecting air compressor 3 to tank 1. The said compressor 3 starts and again raises the pressure to normal in said tank 4. The pressure in tank 4 is thus maintained constant by utilizing part of the energy in tank 1 and the means employed to raise the initial pressure in tank 4 may now be dispensed with.

The temperature of the walls of tank 1 and combustion chamber 48 and the gas contained therein are kept within the necessary limits by the introduction of cold air under pressure from tank 4 through pipe 18 and holes 37. The introduction of this cooling air is controlled by the thermostat 31, operating circuits 23, 22, 41, by means of battery 21, solenoid 20 and valve 19 in manner shown on drawing. The heat abstracted from the walls of and from the products of combustion in, tank 1 by the air in the necessary process of cooling, is not lost but goes to raise the potential energy of the cooling medium introduced which medium is afterward, with the other gases in tank 1, expanded in the engine to do useful work. The air is compressed as near as possible isothermally to reduce the losses, incident to compression, to a minimum.

The method of burning fuel described above, i. e. of introducing the air and fuel separately, of introducing the air hot and the fuel cold in the manner shown, does away with all back firing, incomplete combustion and similar trouble because—1st—
The fuel being without oxygen is incombustible, hence cannot burn back up the tube 7; 2nd—Combustion is complete at all times because hot air in excess of that actually needed for combustion impinging upon the fuel, atomizes, vaporizes and comes in contact with every part of said fuel; 3rd—The flame cannot remain extinguished, because the air to support combustion and coil containing same, are hot enough to ignite fuel if combustion temporarily stops due to shutting down of automatic fuel valve, 46. Should coil 8 become cool due to too long cessation of fuel, thermostat 54 will close electric circuit 55, 56, 57, 58, causing spark to pass across points of spark plug 53 again igniting fuel.

Any liquid fuel or any fuel capable of introduction will burn satisfactorily in the burner described above.

Having thus fully described my invention, what I claim as new and desire to secure by Letters Patent, is:

1. In an internal combustion generator, a combustion chamber, means for introducing fuel and air separately thereinto, means for raising the temperature within the chamber to a sufficient degree to ignite the fuel and air, and means for automatically igniting the said fuel and air when the said temperature falls below the ignition point.

2. In an internal combustion generator, a combustion chamber, an air jacket surrounding the same, a fuel nozzle projecting into the chamber, a pipe connecting said air jacket with said nozzle, means for introducing fuel through said nozzle and air through said pipe into the chamber, means for igniting said fuel and air, and a storage tank for receiving the products of combustion from said combustion chamber.

3. In an internal combustion generator, a combustion chamber, an air supply therefor, a fuel nozzle projecting into the chamber, a pipe coil within said chamber connecting said supply with said nozzle, means for introducing fuel through said nozzle and air through said pipe into the chamber, and means for heating said pipe to a degree sufficient to ignite said fuel and air.

4. In an internal combustion generator, a combustion chamber, an air jacket surrounding the same, a fuel nozzle projecting into the chamber, a pipe coil within said chamber connecting said jacket with said nozzle, means for introducing fuel through said nozzle and air through said pipe into the chamber, and means for heating said pipe to a degree sufficient to ignite said fuel and air.

5. In an internal combustion generator, a combustion chamber, an air jacket surrounding the same, a fuel nozzle projecting into the chamber, a pipe coil within said chamber connecting said jacket with said nozzle, means for introducing fuel through said nozzle and air through said pipe into the chamber, means for heating said pipe to a degree sufficient to ignite said fuel and air, and a storage tank for receiving the products of combustion from said combustion chamber.

6. In an internal combustion generator, a combustion chamber, an air jacket surrounding the same, a fuel nozzle projecting into the chamber, a pipe coil within said chamber connecting said jacket with said nozzle, means for introducing fuel through said nozzle and air through said pipe into the chamber, means for heating said pipe to a predetermined point and auxiliary means automatically operated when the temperature of the pipe falls below a predetermined point for igniting said fuel and air.

7. In an internal combustion generator, a combustion chamber, an air jacket surrounding the same, a fuel nozzle projecting into the chamber, a pipe coil within said chamber connecting said jacket with said nozzle, means for introducing fuel through said nozzle and air through said pipe into the chamber, means for heating said pipe to a degree sufficient to ignite said fuel and air, and auxiliary means automatically operated by the cooling off of said pipe for igniting the fuel and air.

8. In an internal combustion generator, a combustion chamber, an air jacket surrounding the same, a fuel nozzle projecting into the chamber, a pipe coil within said chamber connecting said jacket with said nozzle, means for introducing fuel through said nozzle and air through said pipe into the chamber, means for heating said pipe to a predetermined point, auxiliary means automatically operated when the temperature of the pipe falls below a predetermined point for igniting said fuel and air, and a storage tank for receiving the products of combustion from said combustion chamber.

9. In an internal combustion generator, a combustion chamber, an air jacket surrounding the same, a fuel nozzle projecting into the chamber, a pipe coil within said chamber connecting said jacket with said nozzle, means for introducing fuel through said nozzle and air through said pipe into the chamber, means for heating said pipe to a degree sufficient to ignite said fuel and air, auxiliary means automatically operated by the cooling off of said pipe for igniting the fuel and air, and a storage tank for receiving the products of combustion from said combustion chamber.

10. In an internal combustion generator, a combustion chamber, an air jacket for the same, a fuel nozzle projecting into the chamber, a compressed air supply for forcing air through said jacket into said chamber and for forcing fuel through said nozzle into said chamber, means for igniting said fuel and air, a storage tank for receiving the products of combustion from said chamber, an air pump for the air supply, and means controlled by the pressure in the storage tank for regulating the supply of fuel and air to the chamber.

11. In an internal combustion generator, a combustion chamber, an air jacket for the same, a fuel nozzle projecting into the chamber, a compressed air supply for forcing air through said jacket into said chamber and for forcing fuel through said nozzle into said chamber, means for igniting said fuel and air, a storage tank for receiving the products of combustion from said chamber, an air pump for the air supply, means controlled by the pressure in the storage tank for regulating the supply of fuel and air to the chamber, and means controlled by the pressure in the air supply for regulating the operation of the air pump.

12. In an internal combustion generator, a storage tank for the products of combustion, and means controlled by the temperature of said tank for introducing cold air thereinto.

13. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into the said chamber and fuel through said nozzle into said chamber, means for heating said pipe to a predetermined point, and auxiliary means automatically operated when the temperature of the pipe falls below a predetermined point for igniting said fuel and air.

14. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe coil to a degree at which it will ignite said fuel and air, and auxiliary means controlled by the temperature of said pipe coil for igniting the fuel and air when the temperature of the pipe coil falls below the ignition point.

15. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe to a predetermined point, auxiliary means automatically operated when the temperature of the pipe falls below a predetermined point for igniting said fuel and air, and a storage tank for the products of combustion.

16. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe coil to a degree at which it will ignite said fuel and air, auxiliary means controlled by the temperature of said pipe coil for igniting the fuel and air when the temperature of the pipe coil falls below the ignition point, and a storage tank for the products of combustion.

17. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe to a predetermined point, auxiliary means automatically operated when the temperature of the pipe falls below a predetermined point for igniting said fuel and air, a storage tank for the products of combustion, and means controlled by the temperature of said storage tank for introducing cold air thereinto.

18. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe coil to a degree at which it will ignite said fuel and air, auxiliary means controlled by the temperature of said pipe coil for igniting the fuel and air when the temperature of the pipe coil falls below the ignition point, a storage tank for the products of combustion, and means controlled by the temperature of said storage tank for introducing cold air thereinto.

19. In an internal combustion generator, a combustion chamber, an air jacket surrounding the same, a fuel nozzle projecting into the chamber, a pipe coil within said chamber connecting said jacket with said nozzle, a compressed air supply for forcing air into said jacket and pipe coil into said chamber and fuel through said nozzle into said chamber, means for heating said pipe to a predetermined point, auxiliary means automatically operated when the temperature of the pipe falls below a predetermined point for igniting the said fuel and air, a storage tank for the products of combustion, means controlled by the temperature of said storage tank for introducing cold air thereinto, an air pump for the air supply, and means controlled by the pressure in the storage tank for regulating the supply of fuel and air to the chamber.

20. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe coil to a degree at which it will ignite said fuel and air, auxiliary means controlled by the temperature of said pipe coil for igniting the fuel and air when the temperature of the pipe coil falls below the ignition point, a storage tank for the products of combustion, means controlled by the temperature of said storage tank for introducing cold air thereinto, an air pump for the air supply, and means controlled by the pressure in the storage tank for regulating the supply of fuel and air to the chamber.

21. In an internal combustion generator, a combustion chamber, an air jacket surrounding the same, a fuel nozzle projecting into the chamber, a pipe coil within said chamber connecting said jacket with said nozzle, a compressed air supply for forcing air through said jacket and pipe coil into said chamber and fuel through said nozzle into said chamber, means for heating said pipe coil to a degree at which it will ignite said fuel and air, auxiliary means controlled by the temperature of the said pipe coil for igniting the fuel and air when the temperature of the pipe coil falls below the ignition point, a storage tank for the products of combustion, means controlled by the temperature of said storage tank for introducing cold air thereinto, an air pump for the air supply, means controlled by the pressure in the storage tank for regulating the supply of fuel and air to the chamber, and means controlled by the pressure in the air supply for regulating the operation of the air pump.

IRVING C. JENNINGS.

Witnesses:
GEORGE A. JENNINGS,
CHARLOTTE BEARD JENNINGS.